United States Patent [19]

Finnell et al.

[11] 4,032,835
[45] June 28, 1977

[54] BRUSHLESS EXCITER SUPPLEMENTAL CEILING EXCITATION SYSTEM

[75] Inventors: Leonard W. Finnell, Forest Hills; Sigrud R. Petersen, North Huntingdon; Dale I. Gorden, North Versailles, all of Pa.

[73] Assignee: Westinghouse Electric Corporation, Pittsburgh, Pa.

[22] Filed: Mar. 15, 1976

[21] Appl. No.: 666,813

[52] U.S. Cl. .................................. 322/86; 322/19; 322/25; 322/59
[51] Int. Cl.² ............................................. H02P 9/14
[58] Field of Search ................ 322/25, 19, 28, 46, 322/59, 86, 87, 88, DIG. 2, 60, 24

[56] References Cited

UNITED STATES PATENTS

| 2,879,465 | 3/1959 | Wood | 322/87 X |
| 3,652,920 | 3/1972 | South et al. | 322/87 X |
| 3,863,137 | 1/1975 | Mishima et al. | 322/87 X |

*Primary Examiner*—Robert J. Hickey
*Attorney, Agent, or Firm*—G. H. Telfer

[57] ABSTRACT

An excitation system for a synchronous generator includes a conventional brushless exciter for providing base excitation for rated power output and a controlled source of direct current interconnected with the conventional brushless excitation system to supplement the base excitation. The supplementary excitation is supplied to the rotating field winding of the synchronous generator to provide forcing excitation to permit operation of the generator at power levels which exceed the generator's base power output level. In a preferred embodiment of the present invention, means operable to derive a control signal proportional to a predetermined function of the field winding excitation and of the power output of the generator is provided to control the magnitude and polarity of the supplemental excitation to permit operation of the synchronous generator at power levels which exceed its base power output level, to provide negative direct current excitation to permit fast-de-excitation of the generator, and to provide substantially zero supplemental excitation when the generator is operating at its base power output level.

14 Claims, 6 Drawing Figures

BRUSHLESS EXCITER SUPPLEMENTAL CEILING EXCITATION SYSTEM

BACKGROUND OF THE INVENTION

1. Field of the Invention

The present invention relates to excitation systems for synchronous dynamoelectric machines, and more particularly to means for supplementing the excitation provided by a conventional brushless exciter for a synchronous generater.

2. Description of the Prior Art

Brushless excitation systems are now widely used for supplying direct current field excitation to synchronous dynamoelectric machines such as large alternating current generators. Such brushless excitation system include an alternating current exciter having a stationary field structure and a rotating armature member. A rotating rectifier assembly is carried on a common shaft with the exciter armature and is connected thereto to provide a direct current output. The output of the rectifier is connected to the field winding of the main generator which also rotates with the exciter armature and rectifier. In this way, an excitation system is provided which requires no sliding contacts.

In conventional arrangements, the main exciter for a synchronous generator comprises an alternating generator having its armature mounted on the same shaft as the field winding of the synchronous machine and also having a stator field winding which must be energized by direct current to create a magnetic field so that a voltage will be induced in the rotating armature of the exciter. In well-known arrangements, the direct current excitation for the main exciter is provided by a pilot exciter having a permanent magnet rotor turned by the prime mover within an annular armature winding to produce excitation power for the main exciter. Means such as a rectifier circuit is ordinarily provided to convert the alternating current output of the pilot exciter to direct current for the main exciter field excitation.

This basic brushless excitation arrangement has proven to be entirely satisfactory in providing base excitation for rated voltage output and for providing forcing excitation for nominal speed of response levels. However, there is an increasing demand for synchronous generator systems having a speed of response, i.e., time rate of change of voltage output of 2.5–3.5. It has been the practice to increase the size of the permanent magnet in the pilot exciter to obtain sufficient forcing power to the main exciter field to achieve a faster speed of response. The speed of response of the synchronous generator is directly proportional to the strength of the magnetic field of the permanent magnet pilot generator which is in turn directly proportional to the mass of the permanent magnet rotor assembly. Thus, in order to achieve higher levels of speed of response, a larger permanent magnet pilot generator assembly must be provided. However, this may require a basic change in the mechanical arrangement of the brushless exciter system because of space limitations. The diameter of the permanent magnet generator rotor must be increased greatly to achieve a significant increase in the magnetic field output of the permanent magnet rotor. On some operating machines, a blower located on the permanent magnet hub of the pilot exciter is presently extended to its maximum permissible diameter consistent with permissible dynamic loading. Furthermore, even if no blower were required, a larger permanent magnet assembly would require larger bearings and a stronger supporting structure. Thus, there exists a need for means operable to supplement the excitation provided by the conventional brushless exciter to provide faster speed of response without increasing the size of the permanent magnet assembly of the pilot exciter.

SUMMARY OF THE INVENTION

In accordance with the present invention, means are provided for supplementing the excitation provided by the main exciter of a brushless excitation system for a synchronous dynamoelectric machine. While the invention has particular utility in supplementing the excitation provided to a synchronous generator, it has general utility for any synchronous dynamoelectric machine having a rotating field winding which is excited by direct current.

In conventional synchronous dynamoelectric machines which are energized by a combination of a pilot exciter and a main exciter, base excitation and forcing excitation for the main exciter field winding is provided by the permanent magnetic generator to force the output of the main synchronous generator in response to transient loads. The pilot exciter operates at nominal power output levels to provide base excitation for a rated voltage output of the main synchronous generator. However, because of the forcing excitation requirement, the pilot exciter must be rated to provide as much as two and one-half times the base level excitation when the main synchronous generator is responding to transient loads. Because the forcing excitation is required only infrequently, it may be conveniently provided by a supplemental power source operating independently of the pilot exciter and main exciter.

In the present invention, a controlled supplemental power source is interconnected with the pilot exciter and main exciter field winding to provide forcing excitation for the main exciter during transient operation of the synchronous generator.

In its broadest aspect, the invention provides means for deriving direct current excitation from a controlled source of electrical power, the deriving means having an output circuit connected to supply direct current forcing excitation to the field winding of the synchronous generator to supplement the excitation provided by the pilot exciter. Also provided are means operable to derive a first control signal proportional to a predetermined function of the main exciter field excitation and of the power output of the synchronous generator, the direct current deriving means being connected to receive the control signal and being operable to control the magnitude and polarity of the forcing excitation in response to the predetermined function of the control signal. By this arrangement, supplemental direct current excitation of positive polarity is provided to permit operation of the synchronous generator at a power level exceeding its base operating level during transient loading conditions, and substantially zero excitation being provided when the synchronous generator is operating at a power level substantially equal to its base operating level, and negative excitation being provided during fast de-excitation of the synchronous generator.

According to the features of the present invention, base excitation is provided by the pilot exciter, and forcing excitation and fast de-excitation is provided by the supplemental power source. In practice, the supplemental power source may be a transformer connected to the main synchronous generator output terminals, a moter generator set, or by batteries through an inverter. The supplemental source may be of any convenient line frequency, or it may be direct current. In case of a pilot exciter failure, the supplemental power source may be quickly switched to provide base as well as forcing excitation thus providing a redundant feature for higher generator availability.

BRIEF DESCRIPTION OF THE DRAWINGS

While the specification concludes with claims particularly pointing out and distinctly claiming that which is regarded as the present invention, the organization, the advantages, and further objects of the invention may be readily ascertained from the following detailed description when read in conjunction with the accompanying drawing in which:

DESCRIPTION OF THE PREFERRED EMBODIMENT

Figure 1:
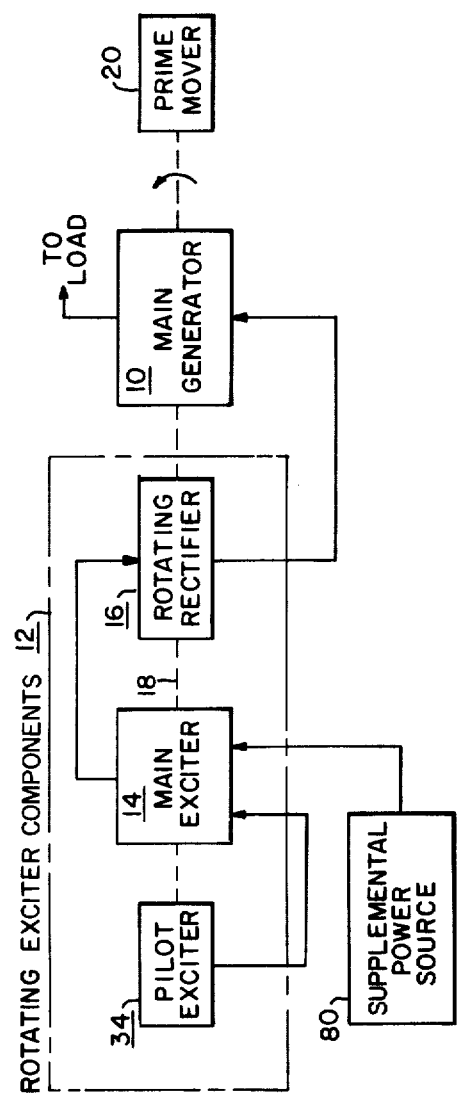
FIG. 1 is a block diagram of a synchronous generator and brushless excitation system which incorporates the present invention.
Figure 2:
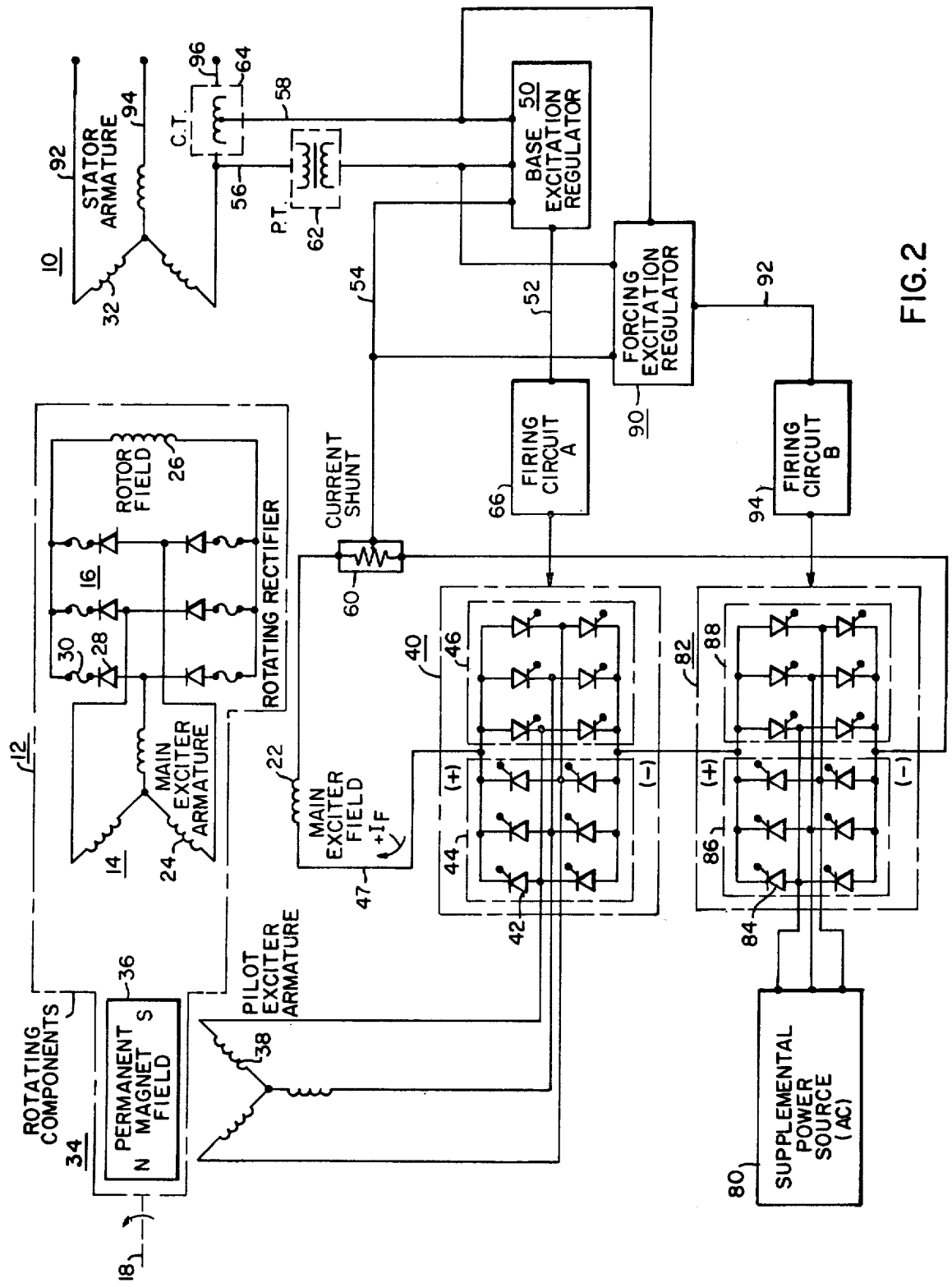
FIG. 2 is a circuit diagram which illustrates a preferred embodiment of the present invention in which supplemental excitation is derived from an alternating current power source.

Referring now to FIGS. 1 and 2, the invention is shown in combination with a synchronous dynamoelectric machine 10 and a brushless excitation system 12 having an alternating current exciter 14 and a rotating rectifier assembly 16 mounted on common shaft 18 for a concurrent rotation by a prime mover 20. The alternating current exciter 14 may be of any suitable type having a stationary stator field member 22 and a rotating armature member 24, the armature member 24 of the exciter 14 comprising a three-phase winding disposed in a core carried on the shaft 18 so as to be rotatable with a main rotor field winding 26 of the synchronous generator 10. The armature winding 24 is connected to the rotating rectifier assembly 16 having a plurality of rectifiers 28 and fuses 30 connected in a bridge arrangement to provide direct current output for excitation of the field winding 26. The direct current excitation flowing through the rotor field winding 26 establishes a magnetic field which induces current flow within a stator armature winding 32 of the synchronous generator 10 when the rotating components of the brushless excitation system are caused to rotate by the prime mover 20.

The main exciter 14 receives its field excitation from a pilot exciter 34 which includes a permanent magnet field member 36 mechanically connected to the shaft 18 for rotation by the prime mover 20. As the shaft 18 rotates, the permanent magnet field is rotated within an annular armature winding member 38 in which alternating current is induced by magnetic induction in the usual manner. The output of the pilot exciter armature winding 38 is connected to a first controlled bridge rectifier assembly 40 which includes a plurality of controlled rectifier elements 42 which are connected in a positive conducting bridge arrangement 44 and a negative conducting bridge arrangement 46. The controlled rectifier elements 42 of the postive conducting bridge group 44 are connected in positive pole relation with respect to the output circuit 47 of the rectifier assembly 40 to conduct positive current, $I_F$, when gated on, from the pilot exciter armature winding 38 to main exciter stator field winding 22. The controlled rectifier elements 42 of the negative conducting bridge group 46 are arranged in a negative pole relation with respect to the output circuit 47 of the rectifier 40 to conduct negative current, when gated on, from the pilot exciter armature winding 38 to the main exciter stator winding 22. By this arrangement, the excitation power from the pilot exciter armature may be used in the usual manner for base excitation of the main exciter, or, the controlled rectifier elements 42 may be switched to reverse the polarity of the voltage and current to provide fast de-excitation for the main exciter field.

The output of the controlled bridge rectifier assembly 40 is controlled by a base excitation regulator 50 which derives a control signal 52 in response to a current signal 54 from the main exciter field winding 22, a voltage signal 56 from the synchronous generator stator armature winding 32, and current signal 58 are also derived from the stator armature winding 32. The current signal 54 may be conveniently derived from a current shunt 60 connected in series electrical relation with the main exciter field winding 22. Likewise, the voltage signal 56 may be derived by means of a potential transformer 62 and the current signal 58 may be derived by means of a current transformer 64, both being connected to one branch of the stator armature winding 32. The output signal 52 of the base excitation regulator 50 is generally proportional to a predetermined function of the level of excitation in the main exciter field circuit and of the power output of the synchronous generator. The control signal 52 is connected to a firing circuit 66 which is operable to selectively energize a predetermined combination of pairs of controlled rectifiers 42 within either the positive conducting bridge 44 or the negative conducting bridge 46 of the rectifier bridge assembly 40. Specific circuits for performing these functions are well known and may be determined by reference to standard texts such as "Thyristor Phase-Controlled Converters and Cycloconverters" by B. R. Pelley, and published by Wylie Interscience.

Figure 5:
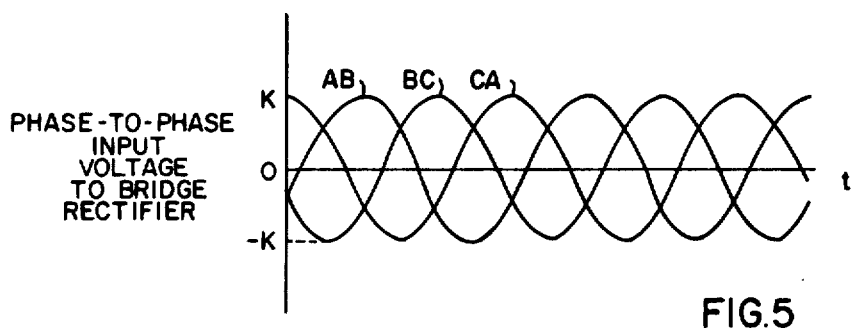
FIG. 5 is a graphical representation of the phase-to-phase input voltage of the bridge rectifiers of FIGS. 2 and 3; and, FIG. 6 is a graphical representation of the forcing excitation range and fast de-excitation range of the bridge rectifier circuits of FIGS. 2 and 3.
Figure 6:
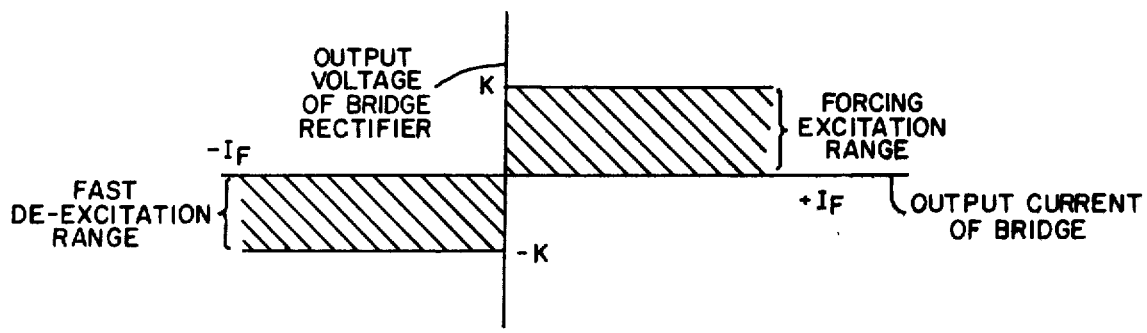

The input and output waveforms for the controlled bridge rectifier circuit 40 is shown in FIGS. 5 and 6 of the drawing. In FIG. 5 the phase-to-phase input voltage to the bridge rectifier is shown to be a three-phase voltage having a generally symmetrical sinusoidal waveform and having an arbitrary positive and negative amplitude of the value K. In FIG. 6 the forcing excitation is seen to vary over a wide range of positive current output and voltage output of a maximum value K which generally corresponds with the amplitude of the input voltage to the bridge rectifier assembly 40. For fast de-excitation, the range has the same general limits, but with the polarity of the current and voltage output of the rectifier circuit 40 reversed.

Figure 4:
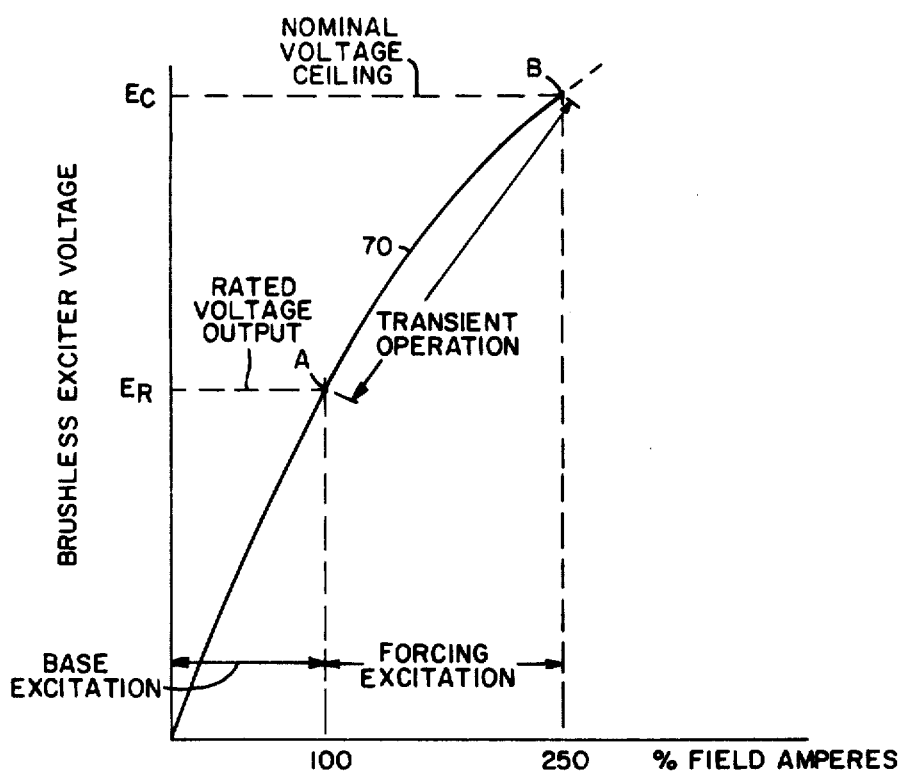
FIG. 4 is a graphical representation of a DC saturation curve for the main exciter of FIG. 1 in which the base excitation and forcing excitation zones are illustrated.

Referring now to FIG. 4, a DC saturation curve 70 of the main exciter 14 is illustrated. Operating Point A corresponds with rated voltage output and 100% base excitation provided by the pilot exciter. The operating Point B corresponds to the nominal voltage ceiling which is determined by the maximum voltage characteristics of the components of the rotating rectifier assembly 16. A portion of the curve 70 between the Points A and B represents the transient operation of the main exciter 14 during forcing excitation in response to loads which fluctuate above the base excitation level.

In the past it has been common practice to provide the forcing excitation by means of the pilot exciter 34 alone. Now, however, according to the present invention, the forcing excitation for transient operation of the synchronous generator 10 is provided by a supplemental power source 80 in cooperation with the pilot exciter 34. In the preferred circuit arrangement as illustrated in FIG. 2, the supplemental power source 80 provides three-phase alternating current to a bridge rectifier circuit 82 which is substantially identical to the bridge rectifier arrangement 40. A bridge rectifier arrangement 82 comprises a plurality of controlled rectifier elements 84 connected in a positive conducting bridge group 86 and a negative conducting bridge group 88. Operation of the bridge rectifier 82 is substantially the same as the operation of the bridge rectifier 40. The output circuit of the bridge rectifier 82 is connected in series electrical relation with the output circuit of the bridge rectifier circuit 40 and with the main exciter stator field winding 22.

A forcing excitation regulator 90 provides a control signal 92 which corresponds to a predetermined function of the power output of the synchronous generator 10 and of the field excitation of the main exciter 14. The control signal 92 is connected to a firing circuit 94 which is operable to control the gating of the control rectifier elements 84 of the bridge rectifier circuit 82 in response to the control signal 92. The output of the control bridge rectifier assembly 82 is held to zero when the pilot exciter 34 is providing base excitation to the main exciter field winding 22 for rated voltage output. During forcing excitation operation, an appropriate control signal 92 is generated by the forcing excitation regulator 90 and causes the control rectifier 84 of the positive conducting bank 86 to conduct positive current to supplement the excitation provided by the pilot exciter 34. When fast de-excitation is indicated, both the base excitation regulator 50 and the forcing excitation regulator 90 are operable to cause the associated firing circuits 66 and 94, respectively, to fire the negative conducting control rectifier elements 42 and 84 of the negative conducting banks 46 and 88, respectively, to conduct negative current for fast de-excitation of the main exciter field 22.

A supplemental AC power source 80 may be embodied by a transformer connected to the generator 10 terminals 92, 94, and 96, or the supplemental AC may be derived from any convenient source which operates independently of the main generator 10. The power supplied by the AC power source may be single-phase or poly-phase power of any convenient line frequency.

Figure 3:
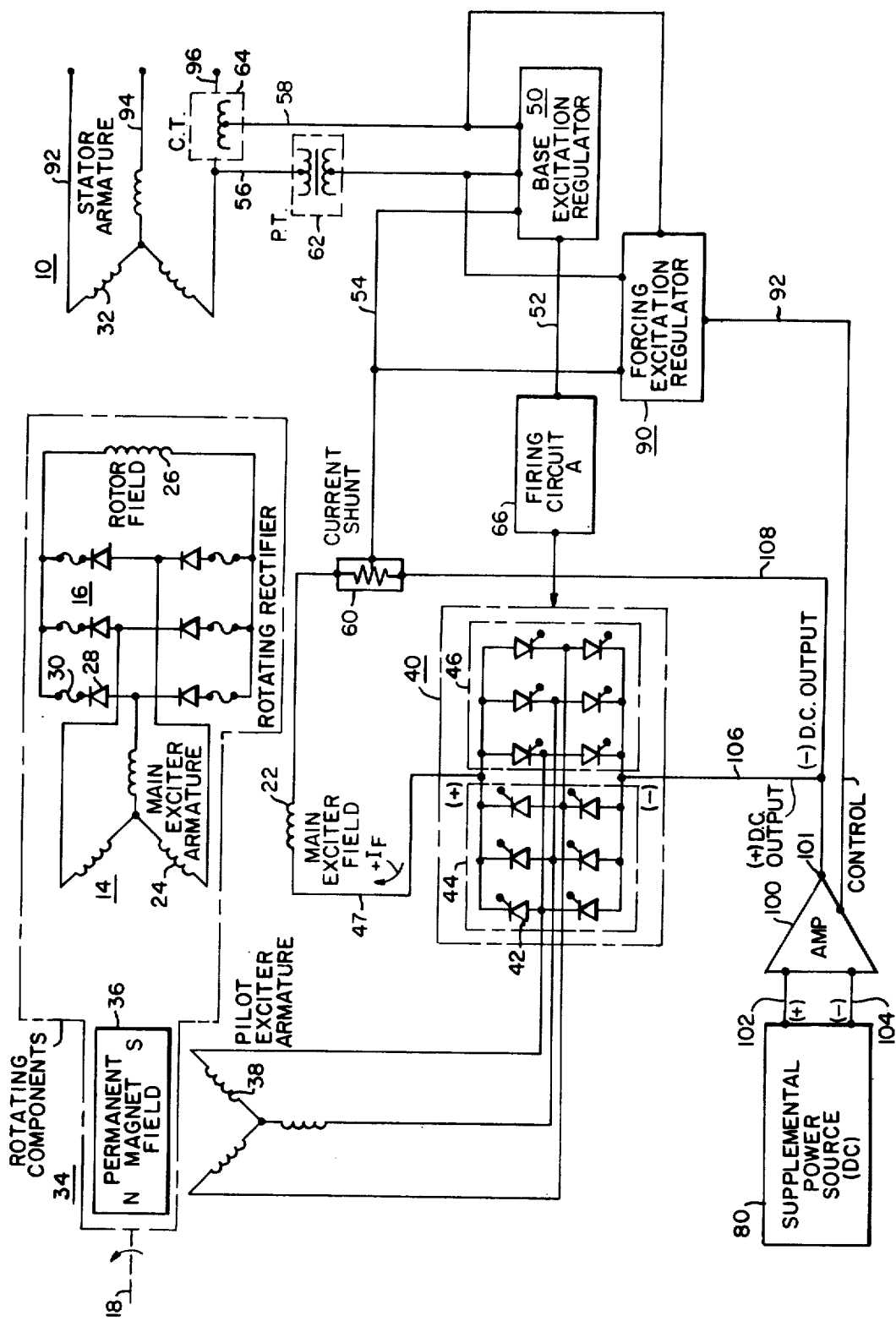
FIG. 3 is a circuit diagram similar to FIG. 2 in which supplemental excitation is derived from a direct current power source.

An alternative arrangement is illustrated in FIG. 3 in which the supplemental power source 80 is a DC power source which may be provided by a bank of batteries or through an inverter connected to an alternating power source. In this arrangement the excitation deriving means comprises a controlled amplifier 100 which is operable to provide a variable DC output of positive or negative polarity at its output terminal 101 from a direct current input from the supplemental DC power source 80 and in response to the control signal 92 from the forcing excitation regualtor 90. The control amplifier 100 has an input circuit 102, 104 which is connected to received direct current excitation from the supplemental power source 80 and has an output circuit 106, 108 connected to supply direct current excitation to the main exciter field winding 22. The control amplifier 100 includes a control circuit which is connected to receive the control signal 92 from the forcing excitation regulator 90. The output circuit 106, 108 of the control amplifier 100 is connected in series electrical relation with the output circuit of the bridge rectifier assembly 40, the main exciter field winding 22, and the current shunt 60 so that its output is summed directly with the output of the bridge rectifier 40 to provide supplemental excitation for the main exciter field winding 22.

The control amplifier 100 provides positive polarity direct current excitation output during the forcing mode of operation of the synchronous generator 10, provides substantially zero output during the base excitation mode of operation of the synchronous generator 10, and provides negative polarity direct current excitation during the fast de-excitation mode of opertion on the synchronous generator 10.

It is therefore apparent that a relatively simple supplemental excitation circuit is provided which operates independently of the pilot exciter to provide forcing excitation or fast de-excitation as needed. In case of a pilot exciter failure, the supplemental power source may be quickly switched to provide base excitation as well as some forcing excitation and thereby provide a redundant feature for higher generator availability and greater overall reliability. Those skilled in the art will recognize that the speed of response of this excitation scheme is extremely fast because of the fast switching characteristics of the controlled rectifiers employed in the controlled rectifier bridge assemblies. Because the output of the controlled rectifier assemblies may be positive or negative, the supplemental power source may be employed during fast de-excitation of the main generator.

While a particular embodiment of the invention has been shown and described for a purpose of illustration, other arrangements and embodiments may be practiced by those skilled in the art without departing from the scope and spirit of the invention. It is not desired, therefore, that the invention be limited to this specific arrangement described herein.

What we claim is:

1. In a synchronous generator of the type having a rotating field winding turned by a prime mover, and wherein direct current excitation for said field winding is derived from said prime mover by an exciter system including a pilot exciter having a permanent magnet rotor turned by said prime mover to permit operation of said generator at a first power output level which corresponds to a base mode of operation, the combination with said exciter system of a controlled source of direct current interconnected with said excitation system to supplement the excitation supplied to said rotating field winding to permit operation of said generator at a second power level which corresponds with a forcing mode of operation, and means operable to derive a control signal proportional to a predetermined function of the excitation applied to said field winding and of the power output of said generator, said controlled source being connected to receive said control signal and being operable to control said supplemental excitation in response to a predetermined function of said control signal.

2. The combination as defined in claim 1, said controlled source being operable to provide a direct current output variable from a first predetermined level of positive polarity through zero to a second predetermined level of negative polarity, said controlled source having an input circuit connected to receive said control signal and being responsive to a predetermined function of the control signal to provide positive direct current forcing excitation to supplement the base excitation supplied to said field winding to permit operation of said dynamoelectric machine at power levels exceeding said first level in said forcing mode of operation, to provide negative direct current excitation to permit fast de-excitation of said machine in a fast de-excitation mode of operation, and to provide substantially zero supplement excitation when said machine is operating at a level substantially equal to said first power output level.

3. In a synchronous generator having a rotor member turned by a prime mover, a field winding disposed on said rotor member, a main exciter having a stator member carrying a field winding and a rotor member carrying an armature winding, a rotatable rectifier assembly having an input circuit connected to receive alternating current power from said main exciter armature and an output circuit connected to conduct direct current excitation through said synchronous machine rotor field winding, means operable to convert the rotational energy of said prime mover to direct current excitation, said converting means having an output circuit connected to provide direct current base excitation to said field winding, the combination with said converting means of means operable to derive direct current excitation from a supplemental source of electrical power, said deriving means having an output circuit connected to supply direct current forcing excitation to said field winding to supplement the excitation provided by said converting means, means operable to derive a first control signal proportional to a predetermined function of the main exciter field excitation and of the power output of said synchronous generator, said excitation deriving means being connected to receive said control signal and being operable to control said forcing excitation in response to a predetermined function of said control signal.

4. The combination defined in claim 3, said first converting means comprising, in combination:
 a pilot exciter having a permanent magnet rotor member carried by said shaft and having a stator member carrying an armature winding; and
 a rectifier circuit operable to convert alternating current to direct current having an input circuit connected to receive alternating current from said pilot exciter armature winding and having an output circuit connected to supply direct current excitation to said main exciter stator field winding.

5. The combination defined in claim 4 wherein said rectifier circuit comprises a plurality of controlled rectifier elements electrically connected in a bridge arrangement, selected ones of said controlled rectifier elements being connected in a positive-pole relation with respect to said output circuit to conduct positive current, when gated on, from said power exciter armature to said main exciter stator field winding.

6. The combination as defined in claim 5, said rectifier circuit including a plurality of controlled rectifier elements connected in a negative pole relation with respect to said output circuit to conduct negative current, when gated on, from said pilot exciter armature to said main exciter field winding, said controlled rectifier elements being arranged in positive and negative current-conducting groups, said groups being electrically connected in parallel with each other, each group comprising at least one pair of said controlled rectifier elements for each phase of said pilot exciter armature, a positively poled rectifier pair and a negatively poled rectifier pair being connected to each phase of said input circuit, each rectifier element being connected between its associated input phase and one side of said direct current output circuit to conduct direct current, when gated on, from said pilot exciter armature to said main exciter field winding, with positive current being conducted through a first preselected combination of said positively-poled rectifier elements, and negative phase-to-phase current being conducted through a second preselected combination of negatively-poled rectifier elements, whereby in response to said first control signal direct current excitation of positive polarity is provided for base excitation in a first and second mode of operation of said synchronous generator, said modes corresponding to base level operation and forcing operation, respectively, and negative excitation being provided to permit fast de-excitation of said synchronous generator in a third mode of operation.

7. The combination defined in claim 3 wherein the supplemental power source provides alternating current and said excitation deriving means comprises a rectifier circuit operable to convert alternating current to direct current, said rectifier circuit having an input circuit connected to receive alternating current from said supplemental power source and having an output circuit connected to supply direct current excitation to said main exciter stator field winding.

8. The combination as defined in claim 7 wherein said rectifier circuit comprises a plurality of controlled rectifier elements electrically connected in a bridge arrangement, selected ones of said rectifier elements being connected in a positive-pole relation with respect to said output circuit to conduct positive current, when gated on, from said alternating current supplemental power source to said main exciter stator field winding.

9. The combination as defined in claim 8 including means operable to derive a second control signal proportional to a predetermined function of the main exciter field excitation and of the power output of said synchronous generator, said controlled rectifier elements each having a gating circuit connected to receive said second control signal and being operable to cause said control rectifier elements to conduct in response to a predetermined function of said second control signal.

10. The combination as defined in claim 9 wherein said rectifier circuit includes a plurality of controlled rectifier elements connected in a negative pole relation with respect to said output circuit to conduct negative current, when gated on, from said pilot exciter armature to said main exciter field winding, said controlled rectifier elements being arranged in positive and negative current-conducting groups, said groups being electrically connected in parallel with each other, each group comprising at least one pair of said controlled rectifier elements for each phase of the said alternating current supplemental power source, a positively-poled rectifier pair and a negatively-poled rectifier pair being connected to each phase of said input circuit, each rectifier element being connected between its associated input phase and one side of said direct current output circuit to conduct direct current, when gated on, from said alternating current supplemental power source to said main exciter field winding, with positive current being conducted through a first preselected combination of said positively-poled rectifier elements, and negative phase-to-phase current being conducted through a second preselected combination of negatively-poled rectifier elements, whereby in response to said first control signal direct current excitation of positive polarity is provided to permit operation of said generator in said first operating mode at a power level exceeding said base operating level, substatially zero excitation being provided when said generator is operating at a power level substantially equal to said base operating level in said second operating mode, and negative excitation being provided during operation of said generator in said third operating mode.

11. The combination defined in claim 3 wherein the supplemental power source provides direct current power and said excitation deriving means comprises a controlled amplifier operable to provide a variable DC output in response to a direct current input and said control signal, said control amplifier having an input circuit connected to received direct current excitation from the supplemental power source, an output circuit connected to supply direct current excitation to said main exciter field winding, and a control circuit connected to receive said control signal from said control signal deriving means, said amplifier providing a positive polarity direct current excitation output during the forcing mode of operation of said synchronous generator, providing zero output during base excitation mode of operation of said synchronous generator, and providing negative polarity direct current excitation during said fast de-excitation mode of operation.

12. In combination,
a synchronous dynamoelectric machine having a stator member carrying an alternating current armature winding and a rotor member carrying a direct current field winding;
a main exciter for said synchronous dynamoelectric machine having a stator member carrying a field winding and a rotor member carrying an armature winding;
a rotatable rectifier assembly having an input circuit connected to receive alternating current power from said main exciter armature and an output circuit connected to conduct direct current excitation through said synchronous machine rotor field winding;
a pilot exciter having a stator member carrying an armature winding and a permanent magnet rotor member;
means mechanically connecting said dynamoelectric machine rotor member, said rotatable rectifier assembly, said main exciter rotor member, and said pilot exciter permanent magnet rotor member for rotation;
means operable to convert alternating current to direct current having an input circuit connected to receive electrical power from said pilot exciter armature winding and having an output circuit connected to supply direct current base excitation to said main exciter stator field winding; and
means for deriving direct current excitation from a supplemental power source, said deriving means having an input circuit connected to receive electrical power from said supplemental power source and having an output circuit connected to supplement the direct current excitation applied to said main exciter stator field winding by said pilot exciter, the output circuits of said converting means and deriving means being connected in series electrical relation with one another and with said main exciter stator field winding.

13. The combination as defined in claim 12 wherein said converting means and said deriving means each comprise a plurality of controlled rectifier elements electrically connected in a bridge arrangement, said controlled rectifier elements being connected in positive pole relation with respect to the output circuit of said bridge to conduct positive current, when gated on, from its associated power source to said main exciter stator field winding.

14. The combination as defined in claim 13 including means for deriving a first control signal proportional to the main exciter field excitation and of the power output of said synchronous dynamoelectric machine, said first control signal means being operably connected to said converting means to control the gating of said controlled rectifier elements of said converting means in response to said first control signal; and,
means for deriving a second control signal which corresponds to a predetermined function of the power output of said generator and of the main exciter field excitation, the output of said second control means being operably connected to said deriving means to control the gating of said controlled rectifier elements of said deriving means in response to said second control signal.

* * * * *